US009476636B2

(12) United States Patent
Cur et al.

(10) Patent No.: US 9,476,636 B2
(45) Date of Patent: Oct. 25, 2016

(54) BLADDER PUMP FOR LIQUID DISPENSING

(71) Applicant: Whirlpool Corporation, Benton Harbor, MI (US)

(72) Inventors: Nihat O. Cur, St. Joseph, MI (US); Steven J. Kuehl, Stevensville, MI (US); Mark M. Senninger, St. Joseph, MI (US); Douglas D. Leclear, Benton Harbor, MI (US); Gregory Gene Hortin, Henderson, KY (US)

(73) Assignee: Whirlpool Corporation, Benton Harbor, MI (US)

( * ) Notice: Subject to any disclaimer, the term of this patent is extended or adjusted under 35 U.S.C. 154(b) by 177 days.

(21) Appl. No.: 14/265,727

(22) Filed: Apr. 30, 2014

(65) Prior Publication Data

US 2015/0315009 A1 Nov. 5, 2015

(51) Int. Cl.

| | |
|---|---|
| ***G01F 11/00*** | (2006.01) |
| ***B67D 7/80*** | (2010.01) |
| ***F25D 23/12*** | (2006.01) |
| ***F25D 31/00*** | (2006.01) |
| ***B67D 1/00*** | (2006.01) |
| ***B67D 1/08*** | (2006.01) |

(Continued)

(52) U.S. Cl.

CPC ........... *F25D 23/126* (2013.01); *B67D 1/0004* (2013.01); *B67D 1/0071* (2013.01); *B67D 1/0865* (2013.01); *B67D 1/10* (2013.01); *F25D 31/002* (2013.01); *B67D 1/0057* (2013.01); *B67D 1/045* (2013.01); *B67D 2210/00036* (2013.01)

(58) Field of Classification Search

CPC B67D 1/0057; B67D 1/0406; B67D 1/0861; B67D 1/0865; B67D 2210/00036; B67D 1/04; B67D 2001/0828; B67D 2001/0827; F25D 23/126

USPC ............................................... 222/146.6, 389

See application file for complete search history.

(56) References Cited

U.S. PATENT DOCUMENTS 4,341,075 A * 7/1982 Backlund .................. F03G 7/04 60/531
4,860,923 A * 8/1989 Kirschner ............ B67D 1/0037 222/1
4,889,662 A 12/1989 Smith (Continued)

FOREIGN PATENT DOCUMENTS

AT EP 2105610 * 9/2009
EP 1092674 A1 4/2001

(Continued)

OTHER PUBLICATIONS

International Patent Application No. PCT/US2015028564 filed Apr. 30, 2015, Applicant: Whirlpool Corporation. International Search Report re: same, mail date Jul. 9, 2015.

*Primary Examiner* — Allen Flanigan
*Assistant Examiner* — Filip Zec

(57) ABSTRACT

A refrigerator includes a main refrigeration loop and a canister configured in a parallel circuit with the main refrigeration loop between the compressor and evaporator, with a liquid-filled bladder within the canister. The canister is pressurized by high-pressure refrigerant from the compressor, which forces the liquid within the bladder out of the bladder and to a pressurized water reservoir in fluid communication with the bladder and configured to house the evaporator and then out to a dispenser.

20 Claims, 2 Drawing Sheets

(51) Int. Cl.
*B67D 1/10* (2006.01)
*B67D 1/04* (2006.01)

(56) References Cited

U.S. PATENT DOCUMENTS

| | | | | | |
|---|---|---|---|---|---|
| 4,907,308 | A * | 3/1990 | Leininger | A61F 7/00 | 165/46 |
| 5,405,054 | A * | 4/1995 | Thomas | A23G 3/28 | 222/105 |
| 5,499,741 | A * | 3/1996 | Scott | B67D 1/0039 | 222/129.4 |
| 5,538,160 | A | 7/1996 | Ziesel | | |
| 5,992,684 | A * | 11/1999 | Russell | B67D 1/006 | 222/1 |
| 6,237,652 | B1 | 5/2001 | Nelson | | |
| 8,109,115 | B2 * | 2/2012 | Pippia | B67D 1/0462 | 222/105 |
| 8,360,278 | B2 * | 1/2013 | Fiedler | B67D 7/0255 | 222/105 |
| 8,944,289 | B2 * | 2/2015 | Cocchi | A23G 9/04 | 222/105 |
| 2007/0033961 | A1 | 2/2007 | Grampassi | | |
| 2014/0117054 | A1 * | 5/2014 | Ryan | C09K 3/30 | 222/386.5 |

FOREIGN PATENT DOCUMENTS

| | | |
|---|---|---|
| GB | 1323492 | 7/1973 |
| WO | 9015962 | 12/1990 |

* cited by examiner

BLADDER PUMP FOR LIQUID DISPENSING

BACKGROUND OF THE DISCLOSURE

The present disclosure relates to the art of dispensing carbonated beverages and, more particularly, to the operation of a liquid dispenser on a refrigeration appliance without the use of an additional pump.

SUMMARY OF THE PRESENT DISCLOSURE

One aspect of the present disclosure includes a refrigerator with main refrigeration loop with a canister configured in a parallel circuit with the main refrigeration loop between the compressor and evaporator, and a bladder disposed within the canister and configured to be pressurized by refrigerant from the compressor. The pressure from the refrigerant within the canister forces liquid to a pressurized water reservoir in fluid communication with the bladder and configured to house the evaporator and out to a dispenser.

Another aspect of the present disclosure includes a refrigeration system, a liquid pump system, and a controller operatively coupled to the refrigeration system and the bladder pump system for selectively operating the refrigerator in a refrigeration mode and a dispensing mode. While in the refrigeration mode, the high-pressure refrigerant is directed by the three-way valve to the evaporator, and while in the dispensing mode, the high-pressure refrigerant is diverted into the parallel refrigerant line through the canister and back into the evaporator.

Yet another aspect of the present disclosure includes a method of providing pressurized liquid by diverting high-pressure refrigerant into a canister, collapsing a bladder containing liquid, urging the liquid through a pressurized water reservoir, carbonizing the liquid and dispensing the liquid.

These and other aspects, objects, and features of the present disclosure will be understood and appreciated by those skilled in the art upon studying the following specification, claims, and appended drawings.

DETAILED DESCRIPTION OF EMBODIMENTS

Figure 1:
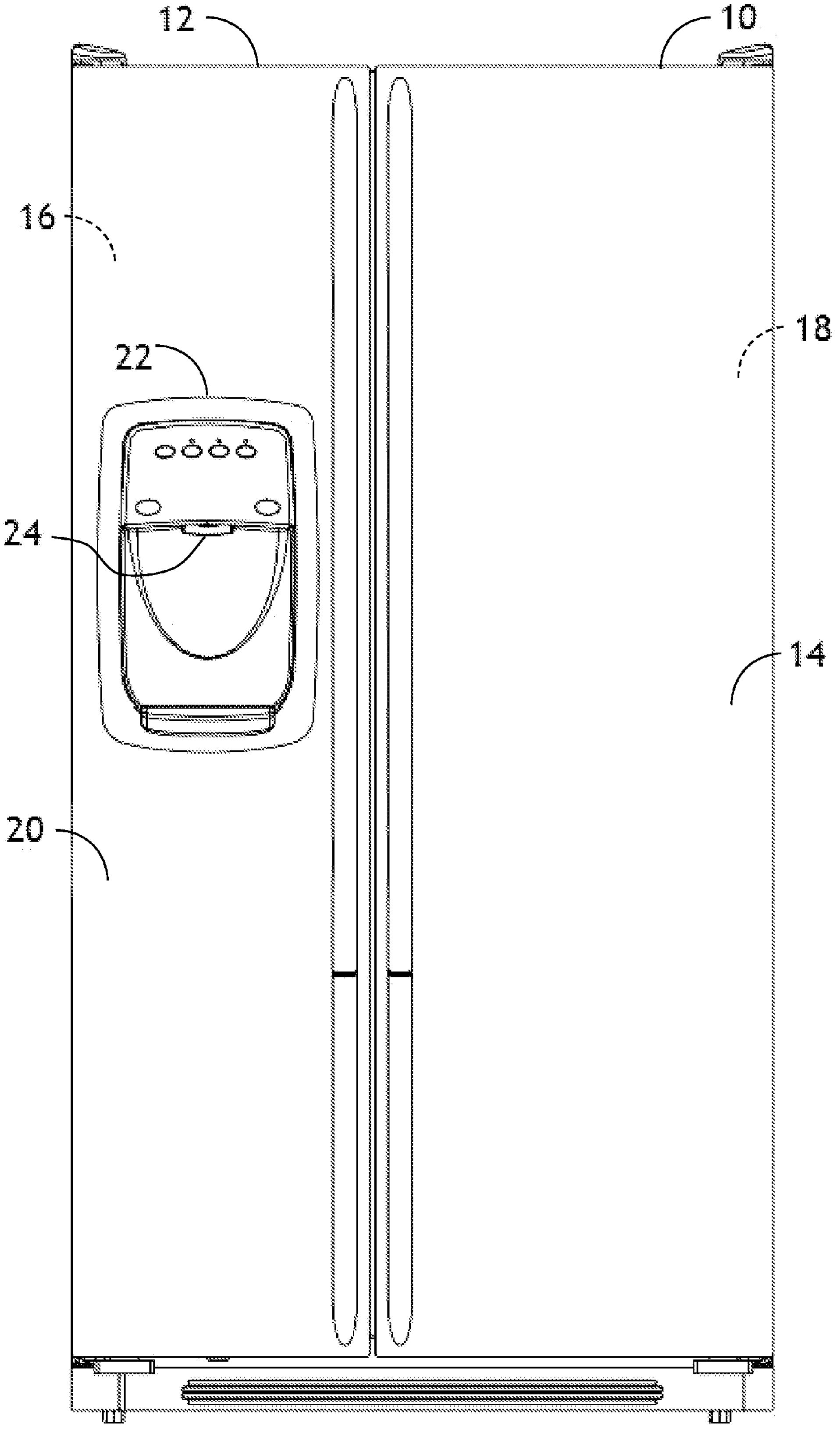
FIG. 1 is a isometric view of one example of a dispensing refrigerator.

For purposes of description herein, the terms “upper,” “lower,” “right,” “left,” “rear,” “front,” “vertical,” “horizontal,” and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Where a range of values is provided, it is understood that each intervening value, to the tenth of the unit of the lower limit unless the context clearly dictates otherwise, between the upper and lower limit of that range, and any other stated or intervening value in that stated range, is encompassed within the disclosure. The upper and lower limits of these smaller ranges may independently be included in the smaller ranges, and are also encompassed within the disclosure, subject to any specifically excluded limit in the stated range. Where the stated range includes one or both of the limits, ranges excluding either or both of those included limits are also included in the disclosure.

In this specification and the appended claims, the singular forms “a,” “an” and “the” include plural reference unless the context clearly dictates otherwise.

FIG. 1 is a perspective view showing an embodiment of a refrigerator 10 having a beverage dispensing system 22. The refrigerator 10 includes a refrigerator cabinet 12. The cabinet 12 is an insulated cabinet. The refrigerator 10 further includes a fresh food compartment 14 and a freezer compartment 16, which are disposed within the refrigerator cabinet 12. A fresh food door 18 provides access to the fresh food compartment 14. A freezer door 20 provides access to the freezer compartment 16. The beverage dispensing system 22 may include a dispenser 24. Although the refrigerator 10 of FIG. 1 is shown in a side-by-side configuration, the refrigerator may be otherwise configured, such as in a bottom mount configuration with French doors.

Figure 2:
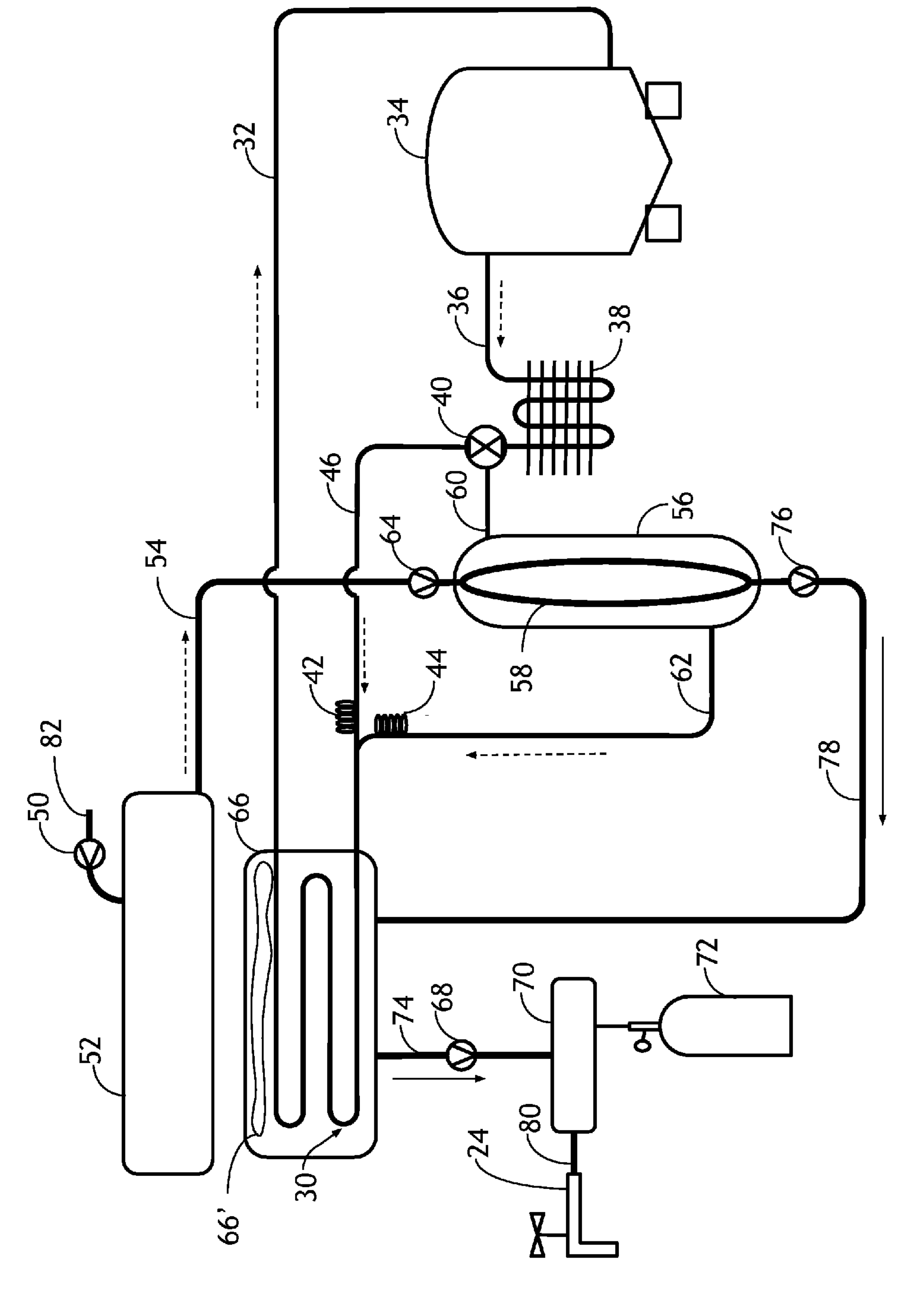
FIG. 2 is a schematic illustration of one embodiment of the present disclosure.

Details of a refrigeration system for the refrigerator 10 will be set forth with reference to FIG. 2. As shown, the refrigeration system may have a compressor 34. The compressor may be connected at an inlet (not shown) to a suction line 32. The compressor may also be connected at an outlet (not shown) to a discharge line 36. Downstream from the compressor outlet the discharge line 36 leads to a condenser 38. The condenser 38 leads to a refrigerant three-way valve 40. The main refrigerant liquid line 46 connects the refrigerant three-way valve 40 to an expansion device 42. The outlet (not shown) of the expansion device 42 connects to an evaporator 30. From the evaporator 30, the suction line 32 connects back to the inlet of compressor 34 as described above.

Also stemming from the refrigerant three-way valve 40, is a canister inlet line 60, which is connected to an inlet (not shown) on a canister 56. The canister 56 also has an outlet (not shown) that leads to a canister outlet line 62. The canister outlet line connects to an expansion device 44 which leads back into evaporator 30.

Potable water enters the refrigerator from a household portable water line (not shown), and a household portable water valve 50 allows potable water into an ambient water reservoir 52. The ambient water reservoir 52 is connected to a bladder 58 via a water line 54 and a two-way water valve 64. The bladder 58 may be a double-walled structure of a food-grade elastic material which may be substantially gas impermeable. Downstream from this is a bladder outlet valve 76 leading into a bladder outlet line 78. The bladder outlet line 78 is connected to a chilled water reservoir 66 which is in turn connected to a water reservoir outlet line 74 with the check valve 68. The water reservoir outlet line 74 is connected to a carbonator 70. A carbon dioxide source 72 is connected to the carbonator 70 which provides carbonation to the carbonator 70. The dispenser 24 is connected to the carbonator 70 through a dispenser line 80 at an outlet of the carbonator 70.

Ambient potable water is introduced into the insulated water reservoir 52. The water may be manually filled to an atmospheric pressure in the insulated water reservoir 52 and gravity fed to the bladder 58, or may be automatically introduced into the water reservoir 52 via a household potable water inlet (not shown) and a two-way valve 50.

When a user indicates that potable water is necessary at the dispenser 24, via a button on the user interface, a lever in the beverage dispensing system 22, or any other suitable input, a proximity switch (not shown) may provide a signal to the controller (not shown). The controller may be a printed circuit board (PCB) or anything else known in the art that may be electrically connected to the valves and the refrigeration system as shown. The control may send a signal to the refrigerant three-way valve 42 open up towards the canister inlet line 60, as well as signaling the compressor 34 to start. At the same time the bladder inlet valve 64 may close, and a bladder outlet valve 76 may open. Valves 64 and 76 may also be check valves, and prevent backflow thus only allowing flow in a direction from the potable water inlet to the outlet 24.

With the compressor 34 running, high pressure liquid issues from the condenser 38 and into the refrigerant three-way valve 40. The refrigerant three-way valve 40 may allow the high-pressure liquid to travel through the canister inlet line 60 and into the canister 56, increasing the pressure around the bladder 58. Optimally, the high-pressure liquid exiting the compressor 34 will be charged to a pressure about 120 psig to about 150 psig. This increased pressure on the bladder 58 will force the water through the now open bladder outlet valve 76 and through the bladder outlet line 78. The water will continue to travel into the pressurized water reservoir 66 where the water is chilled by the evaporator 30. The water may be chilled through direct contact with the evaporator 30 which may be located in the pressurized water reservoir 66. In another embodiment, the evaporator may be in thermal contact with the exterior of the pressurized water reservoir 66, cooling the reservoir and indirectly cooling the water within the pressurized water reservoir 66.

Air contained within a bladder 66' disposed in the pressurized water reservoir 66 is compressed, and can act as a buffer when the pressurized water reservoir 66 is open to dispense so that the incompressible water is not dramatically reduced in pressure in the pressurized water reservoir 66 leading to the carbonator 70. Optimally, this compressed air will keep the water held in the pressurized water reservoir 66 at about 70 psig to about 130 psig.

From the pressurized water reservoir 66 the water will travel down the water reservoir outlet line 74 through a check valve 68 and into the carbonator 70. The carbonator 70 is connected to a carbonation source 72, which as shown is a carbon dioxide bottle with a regulator. The water travels through the carbonator 70 and is carbonated before traveling through the dispenser line 80 and exiting the refrigerator through the dispenser 24 where the user may access the now carbonated, chilled water. In another embodiment, the dispensing system 22 may also bypass the carbonator 70 and dispense non-carbonated water out of the dispenser 24.

Once the bladder 58 is collapsed, the refrigerant three-way valve 40 allows flow through the parallel circuit to the evaporator 30 used to chilled water in the pressurized water reservoir 66. The suction line 32 may be thermally coupled to the condenser 38 and ensuring any liquid refrigerant not flashed in the evaporator 30 is vaporized before returning to the compressor 34. Thus, a water pump capable of reaching refrigerant compressor condensing pressures (high enough to provide for good carbonation levels) is provided for the price of a three-way refrigerant valve and some connecting tubing and capillary tubing.

In another embodiment, the pressure on the bladder 58 may be supplied pneumatically by the carbon dioxide source 72. In this embodiment, a $CO_2$ gas line stems from the carbon dioxide source 72, to the canister 56, filling the canister 56 with $CO_2$ gas until a desired pressure on the bladder 58 is reached.

In operation, a user actuates a valve or a switch to dispense fluid on the user interface 22 or at the nozzle 24, sending a signal to a refrigerator control (not shown) that water is desired at the nozzle 24. In turn, a drop in pressure in pressurized water reservoir 66 is sensed and the compressor 34 is activated. Valve 40 may be closed to line 46 and opened to line 60, thus sending pressurized refrigerant into canister 56, thus collapsing the bladder 58 and forcing water out of the bladder 58, through line 78, and into pressurized water reservoir 66, thus restoring pressure in the reservoir 66. The refrigerator control may include some time delay mechanism to allow water to fill the bladder 58 prior to compressor discharge pressure reaching desired pressure levels. Initially, the valve 40 will be open to line 46, which allows the pressure within line 60, canister 56, and line 62 to drop, allowing water to fill the bladder 58. This sequence may be repeated based on a function of desired pressure within the reservoir 66. The desired pressure may be detected within the canister 56 and reservoir 66 by pressure sensors or switches (not shown) that are well known in the art.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A beverage dispensing appliance comprising:

a main refrigeration loop comprising a refrigerant line with refrigerant, a compressor, a condenser, and an evaporator;

a canister fluidly coupled to the compressor and evaporator and configured in a parallel circuit with the main refrigeration loop, a bladder disposed within the canister, comprising an inlet valve and an outlet valve, wherein the bladder is configured with a first state in which the inlet valve is open and the outlet valve is closed, and the pressure within the canister is ambient, and a second state in which the inlet valve is closed and the outlet valve is open, and the pressure within the canister is pressurized by refrigerant from the compressor;

a pressurized water reservoir in fluid communication with the bladder and housing the evaporator; and a dispenser.

2. The beverage dispensing appliance of claim 1, further comprising a carbonator system disposed between and fluidly coupled with the pressurized water reservoir and the dispenser.

3. The beverage dispensing appliance of claim 2, wherein the carbonator system comprises a carbonator in fluid communication with the pressurized water reservoir and the dispenser.

4. The beverage dispensing appliance of claim 3, further comprising a carbon dioxide bottle with a regulator in fluid communication with the carbonator.

5. The beverage dispensing appliance of claim 1, wherein the bladder is made of an elastomeric material.

6. The beverage dispensing appliance of claim 1, further comprising an ambient water reservoir disposed upstream of and in fluid communication with the bladder.

7. The beverage dispensing appliance of claim 6, wherein the ambient water reservoir is supplied with water from a household water supply.

8. The beverage dispensing appliance of claim 6, wherein the ambient water reservoir is manually filled by a user.

9. The beverage dispensing appliance of claim 1, wherein the pressurized water reservoir is pressurized by compressed air.

10. A refrigerator comprising:

(i) a refrigeration system, the refrigeration system comprising:

a compressor;

a condenser adapted to provide a high-pressure refrigerant;

a compressor discharge line disposed downstream the compressor and configured to loop through the condenser;

an evaporator disposed downstream and in fluid communication with the compressor discharge line; and a three-way valve disposed between the condenser and the evaporator; and (ii) a bladder pump system, the bladder pump system comprising:

a parallel refrigerant line disposed between the three-way valve and the evaporator;

a canister disposed in the parallel refrigerant line and in fluid communication with the compressor and the evaporator;

a flexible bladder configured within the canister and adapted to hold potable liquid;

a pressurized water reservoir disposed downstream the bladder; and a dispenser; and (iii) a controller operatively coupled to the refrigeration system and the bladder pump system for selectively operating the refrigerator in a refrigeration mode and a dispensing mode, wherein in the refrigeration mode, the high-pressure refrigerant is directed by the three-way valve to the evaporator, and wherein in the dispensing mode, the high-pressure refrigerant is diverted into the parallel refrigerant line through the canister and back into the evaporator.

11. The refrigerator of claim 10, wherein the bladder comprises an inlet valve and an outlet valve.

12. The refrigerator of claim 11, wherein in the refrigeration mode the inlet valve is open and the outlet valve is closed.

13. The refrigerator of claim 11, wherein in the dispensing mode the inlet valve is closed and the outlet valve is open.

14. The refrigerator of claim 10, further comprising a carbonator system disposed between and fluidly coupled with the pressurized water reservoir and the dispenser.

15. The refrigerator of claim 14, wherein the carbonator system comprises a carbonator in fluid communication with the pressurized water reservoir and the dispenser.

16. The refrigerator of claim 15, further comprising a carbon dioxide bottle with a regulator in fluid communication with the carbonator.

17. The refrigerator of claim 10, further comprising an ambient water reservoir.

18. The refrigerator of claim 10, wherein the evaporator is disposed within the pressurized water reservoir.

19. A method of pumping liquid through a refrigerator dispenser, the method comprising:

providing a refrigeration system comprising a compressor, compressor discharge line, condenser, three-way valve, evaporator, and a suction line in serial fluid communication;

providing a water dispensing system comprising a water inlet, bladder feed line, a flexible bladder, bladder outlet line, pressurized water reservoir, dispenser line, and a dispenser;

providing a canister within a refrigerant line in parallel to the refrigeration system between the three-way valve and the evaporator, filling the bladder with liquid;

selecting a dispensing mode for the refrigerator;

opening the three-way valve path between the condenser and the canister;

pressurizing the canister with high-pressure refrigerant from the compressor;

collapsing the bladder with the high-pressure refrigerant in the canister;

urging the liquid within the bladder through the bladder outlet line and into the pressurized water reservoir;

cooling the liquid in the pressurized water reservoir through thermal contact with the evaporator;

urging the liquid from the pressurized water reservoir through the dispenser line; and dispensing the liquid to a user.

20. The method of claim 19, further comprising the steps of providing a carbonizer disposed between the pressurized water reservoir and the dispenser and carbonizing the liquid prior to dispensing.

* * * * *